Nov. 12, 1940.  K. M. LEDERER  2,221,643

ELECTRICAL MEASURING INSTRUMENT

Filed June 7, 1938   3 Sheets-Sheet 1

Inventor:

Karl M. Lederer,

By Potter, Pierce & Scheffler,
Attorneys.

Nov. 12, 1940.    K. M. LEDERER    2,221,643
ELECTRICAL MEASURING INSTRUMENT
Filed June 7, 1938    3 Sheets-Sheet 2
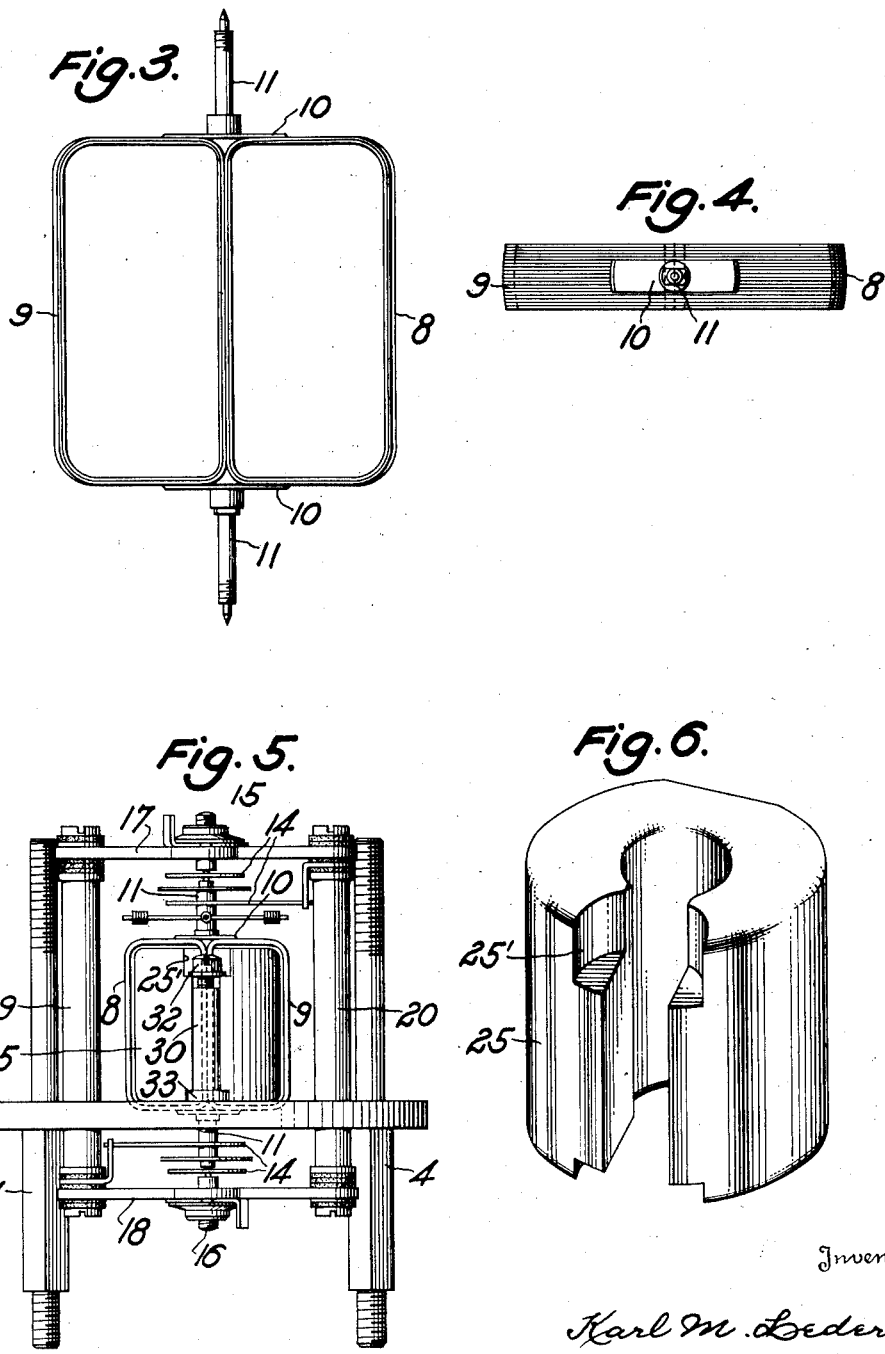

Nov. 12, 1940. K. M. LEDERER 2,221,643
ELECTRICAL MEASURING INSTRUMENT
Filed June 7, 1938 3 Sheets-Sheet 3
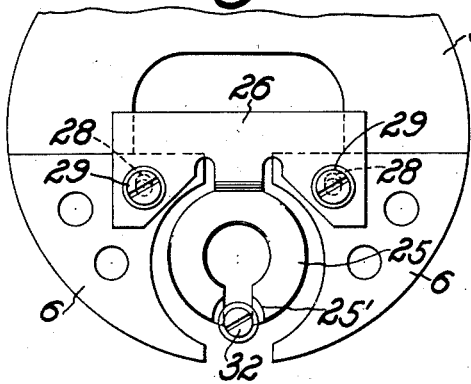
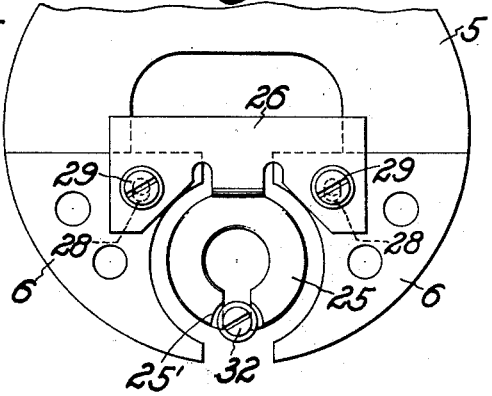
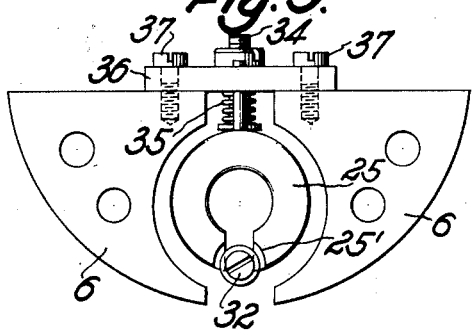
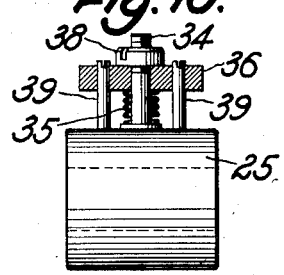
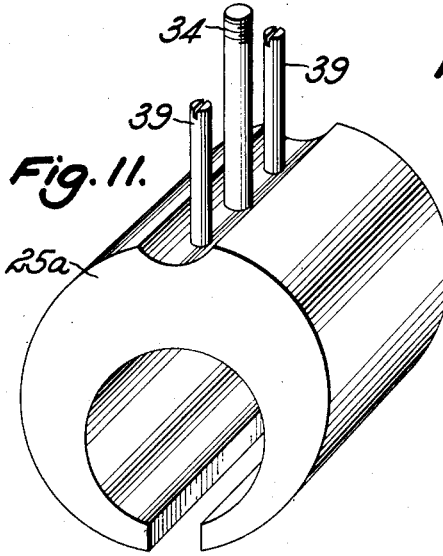
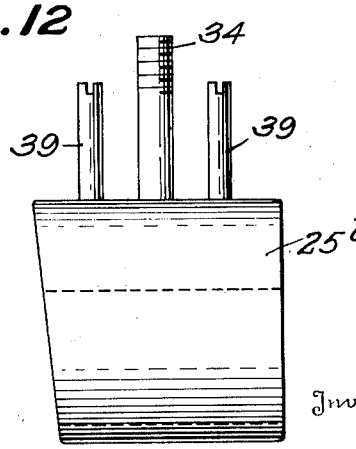
Inventor:
Karl M. Lederer,
By Potter, Pierce & Scheffler,
Attorneys.

Patented Nov. 12, 1940

2,221,643

UNITED STATES PATENT OFFICE 2,221,643

ELECTRICAL MEASURING INSTRUMENT

Karl M. Lederer, Newark, N. J., assignor to Weston Electrical Instrument Corporation, Newark, N. J., a corporation of New Jersey Application June 7, 1938, Serial No. 212,352
In Great Britain March 4, 1938

13 Claims. (Cl. 171—95)

This invention relates to electrical measuring instruments of the moving coil, permanent magnet type and more particularly to instruments for measuring or indicating the magnitude of a factor which varies as the ratio of two currents.

One advantage of such instruments, known as ratio or quotient meters, arises from the fact that the normal variations of impressed potentials produce only negligible errors in the instrument indications of ratios of currents, impedances, voltages and the like. The prior ratio meters have been open, in general, to the objections that they were cumbersome, inaccurate, of low sensitivity, difficult to adjust and/or expensive to manufacture.

An object of the present invention is to provide ratio meters which are free from the defects of the prior instruments. An object is to provide ratio meters in which the mechanical construction, assembly and relation of the parts result in small instruments of light weight and small energy consumption that are suitable for use where lightness, sensitivity and ruggedness are of major importance. A further object is to provide ratio meters including two rigidly connected movable coils and a magnetic system having relatively movable parts that may be readily and accurately adjusted to change the relationship of the coil deflection to current ratios to meet desired requirements. More particularly, objects are to provide novel constructions of double coils and of magnetic systems for use in ratio meters.

These and other objects and advantages of the invention will be apparent from the following specification when taken with the accompanying drawings in which:

Figs. 3 and 4 are a side elevation and plan view, respectively, of the moving coil assembly;

Fig. 5 is an end view of the supporting structure and coil assembly as seen after removal of the magnetic system and casing;

Fig. 6 is a perspective view of one form of core construction;

Figs. 7 and 8 are similar plan views of the core and pole pieces of an instrument, the views illustrating, respectively, minimum and maximum adjustments of the air gap at the inner ends of the pole faces;

Fig. 9 is a fragmentary plan view of another form of adjustable core mounting;

Fig. 10 is a side elevation of the core of Fig. 9;

Fig. 11 is a perspective view of a core of non-uniform cross-section that may be used with any of the illustrated adjustable mountings; and Fig. 12 is a side elevation of a core with non-parallel end faces that may be used with any of the illustrated core mountings.

Figure 1:
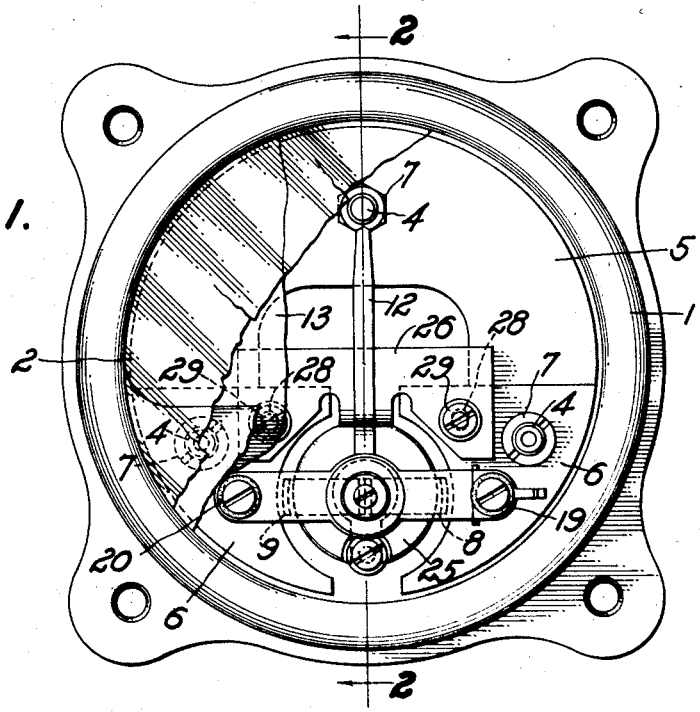
Fig. 1 is a plan view of an instrument embodying the invention.

In the drawings, the reference numeral 1 identifies an instrument casing of any desired design within which the instrument is housed and exposed to view by the cover glass 2. The instrument proper includes the supporting base 3 that is secured to the case 1 by studs 4 that extend through the magnet 5 and its pole pieces 6, the latter being preferably of soft iron, and the magnetic system is secured to the base 3 by nuts 7 on the ends of studs 4. The moving system of the instrument comprises the two coils 8, 9 that are mounted in the same plane, Figs. 3 and 4, and secured to each other and to the upper and lower pivot bases 10 by suitable adhesive material. The weight of the moving system is thus reduced to a minimum by the elimination of the shaft to which the adjacent sides of the coils were previously secured. The pivots 11 of the pivot bases provide a rotational axis which passes between the adjacent faces of the coils 8, 9. The instrument pointer 12 is mounted on one pivot base 10 for displacement over the scale plate 13.

The coils 8, 9 are wound in the same or in opposite sense depending upon the direction of flow of the currents introduced into the coils through the pairs of springs 14 which are thin filaments that introduce a negligible couple of forces when no current flows through the moving system. The coils usually have the same number of turns but, for extremely large ratios of applied currents, the number of turns may be different. The pivots 11 of the coil system rotate in bearings 15, 16 carried by bridges 17, 18, respectively, that are supported at opposite sides of the base 3 by the studs 19, 20.

The C-shaped core 25 lies in the gap between the pole faces of the pole pieces 6 and has such shape and/or location with reference to the pole faces that the length of the air gap at the respective coils 8, 9 varies with the angular displacement of the coil system. The prior practice has been to mount the core rigidly and eccentrically to substantially cylindrical polar faces, thus providing a definite relationship between pointer deflections and current ratios. According to this invention, the core 25 is mounted for adjustment in the plane of symmetry between the polar surface and normal to the axis of the polar surface to obtain a desired angular deflection of the pointer for a given ratio of currents in the moving coils.

Figure 2:
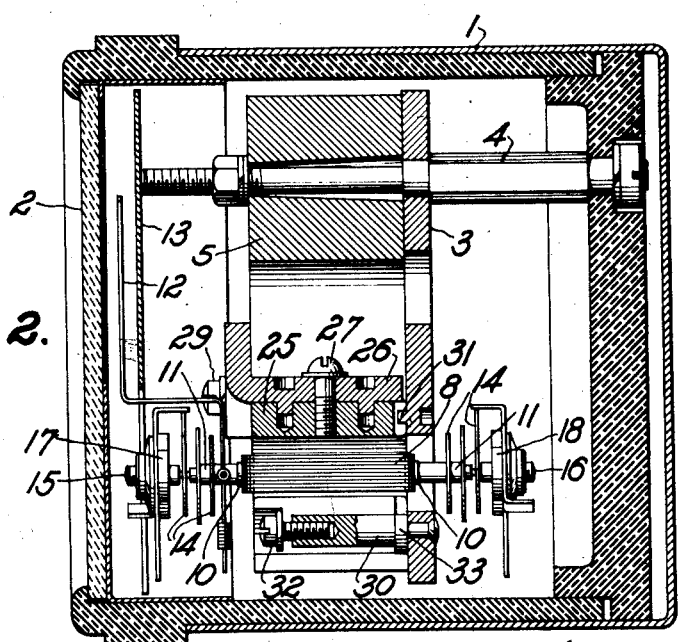
Fig. 2 is a sectional view substantially on the plane of line 2—2 of Fig. 1.

As shown in Figs. 1, 2, 7 and 8, the core 25 is rigidly secured to a bracket 26 by the screw 27, and the bracket has elongated slots 28 for receiving bolts or studs 29 that secure the bracket to the pole pieces 6. Adjustment of core 25 from the position of minimum air gap at the inner edges of the pole faces, Fig. 7, to the position of maximum air gap at that region, Fig. 8, provides a wide variation in the rate of change of the length of air gaps with angular displacement of the coil system, and thus controls the relation of current ratio to pointer deflection. The core 25 is accurately guided to insure symmetrical variation of the air gaps at opposite sides of the instrument center line by the stud 30 that is mounted on base 3 and has a close fit in the open slot of the C-shaped core 25, and the lug 31 that is pressed from the base 3 to engage in a slot in the bottom of the core between the inner edges of the pole faces. A screw 32 is threaded into the stud 30 to clamp the outer edge of the core to the washer 33 on stud 30 when the desired adjustment is obtained. The contacting surfaces of the core and washer 33 are normal to the core axis to insure the same axial position of the core at all transverse adjustments. The end of the core 25 may be cut away to form a recess 25', Fig. 6, in which the clamp screw 32 is located below the path of travel of the coil system.

The graduations are approximately uniform over the scale range when the opposed polar and core surfaces conform to surfaces of right circular cylinders, and portions of the scale may be contracted or expanded by altering the contour of the surface. The extent to which the measuring range may be varied by adjustment of the eccentricity of the core will depend upon the dimensions of opposed surfaces of the outer air gaps and, in practical instruments of small size, the measuring range may be adjusted by a factor of from 2.3 to 3. The minimum eccentricity of a particular core in a polar gap may provide, for example, a full scale deflection at a current ratio of 1 to 1.1, while the maximum eccentricity of the core results in a full scale deflection at a current ratio of about 1 to 2.5. Other ranges of current ratios may be obtained with the same permanent magnet and coil system by the use of other cores and instruments of widely different measuring ranges may thus be assembled from standardized sets of pole pieces and cores of but two or three sizes.

The invention is not limited to any particular dimensions but the following data is given as illustrative of constructions which have proved satisfactory. Cores having an outer diameter of from 0.58 to 0.60 inch were used with cylindrical polar surfaces of from about 0.70 to 0.80 inch diameter, and the eccentricity of the cores was adjusted between values of from about 0.003 to 0.050 inch to determine the measuring range of the minimum and maximum current ratios corresponding to the limits of the scale graduations.

Another construction for obtaining a definite adjustment of the air gap shape, as shown in Figs. 9 and 10, includes a threaded stud 34 fixed to the core 25 and a spring 35 surrounding the stud and bearing on the bracket 36 that is secured to the pole pieces 6 by screws 37. The position into which the core is carried by the spring 35 is determined by the adjustment of nut 38 on the stud 34, and the core is accurately guided by studs 39 which are threaded into the core and pass through openings in the bracket 36.

The cores 25 of the described embodiments have been illustrated as annular cores with concentric interior and exterior surfaces. The variation of the air gap at a given adjustment of the core in a polar gap, and the rate of change of the effective air gap with adjustments of the core, may be accentuated by the use of cores of non-uniform radial cross-section. As shown in Fig. 11, the core 25a has cylindrical but eccentrically arranged inner and exterior surfaces which result in a crescent-shaped cross-section that tends to concentrate the magnetic flux towards the inner edges of the pole faces. The core 25b of Fig. 12 has an upper end surface that is inclined to the other end surface and axis of the core to decrease the radial cross-section towards the shorter side of the core. A further concentration of the flux at one side of the air gap and a corresponding diminution of the flux at the opposite side may be had with permanent magnet cores of high coercive force, thus substantially increasing the current ratio in the coils without adversely affecting the stability of the instrument.

Instruments of the described constructions may be readily calibrated by applying currents of definite ratio to the coils and adjusting the core to bring the pointer to the appropriate scale deflection.

The construction of the parts for the adjustable support of the core may be varied and the core supporting bracket may be located at the outer side of the magnetic system in place of its illustrated location at the inner face of the pole pieces. It is desirable, however, that the core be supported by parts which are so located and designed that the core may be adjusted to provide a symmetrical increase or decrease in the air gaps between the core and pole pieces without dismantling the moving coil system or any other principal parts of the instrument.

The several embodiments of the invention indicate that there is considerable latitude in the design and construction of ratio meters conforming to this invention and it is to be understood that further variations are permissible within the spirit of the invention as set forth in the following claims.

I claim:

1. In an electrical measuring instrument, a moving coil system, a magnetic structure including spaced polar faces, means supporting said coil system for pivotal movement in the gap between said polar faces, a core in said gap, and means mounting in said core for rectilinear displacement in the plane of symmetry between said polar faces and rectilinear displacement in the plane of symmetry between said polar faces and normal to the axis of the polar surfaces, thereby to alter the eccentricity of the core with respect to the polar faces.

2. In an electrical measuring instrument as claimed in claim 1, mounting means including a bracket to which said core is rigidly secured, said bracket having elongated slots, and bolts extending through said slots and into said magnetic system for securing said bracket in a desired position of adjustment.

3. The invention as claimed in claim 1, in combination with guide means insuring displacement of said core along a predetermined path upon adjustment thereof.

4. An electrical measuring instrument comprising a magnetic system including a magnet having spaced polar faces and a core in the gap between said polar faces, a moving system mounted for rotation within the gap between said polar faces, means operable while the moving system is in mounted position to adjust the eccentricity of said core within said gap, and means for preventing axial displacement of said core during adjustment thereof.

5. In an electrical measuring instrument, a magnetic system having spaced polar surfaces, a bracket secured to said magnetic system, a core in the gap between said polar surfaces, a threaded stud secured to said core and extending through an opening in said bracket, a spring between said core and bracket tending to displace said core, a nut threaded on said stud at the side of said bracket remote from said core to determine the location of said core with respect to said polar surfaces, and a moving system supported for angular displacement in the gap between said polar surfaces.

6. In an electrical measuring instrument of the moving coil type, a permanent magnet system having spaced polar surfaces, a cylindrical core having a bore extending longitudinally therethrough and a slot extending continuously along one side of said core to impart an approximately C-shaped transverse cross-section to the core, the surface of the bore being cylindrical and eccentric to the outer cylindrical surface to provide the minimum transverse wall thickness at the region of the slot, means supporting said core in the gap between said polar surfaces, and a moving coil system having a pivotal axis parallel to the axes of said cylindrical core surfaces.

7. The invention as claimed in claim 6, wherein said supporting means for said core comprises means adjustable to displace the core with respect to said polar surfaces, and guide means restricting displacement of the core to movement along a predetermined path.

8. The invention as claimed in claim 6, wherein the end surfaces of said core are inclined to each other.

9. In an electrical measuring instrument, the combination with a magnetic system having spaced polar surfaces, and a coil pivotally mounted in the space between said polar surfaces, of a core mounted in the space between said polar surfaces, said core being cylindrical with its axis parallel to the axis of rotation of said coil, the end surfaces of said core being inclined to each other.

10. In an electrical measuring instrument of the ratio meter type, a moving coil system comprising two coils, a permanent magnet system including spaced polar faces conforming substantially to cylindrical surfaces, a cylindrical core having a bore extending therethrough, said core being located in the gap between said polar faces, means supporting said moving coil system for pivotal movement in the gap between said polar faces and about an axis parallel to said polar faces, each of said coils having a portion thereof movable along a polar face and another portion located within the bore of said core, and means supporting said core for rectilinear displacement thereof normal to the axis of said polar faces to vary the eccentricity of said core with respect to said polar faces.

11. In an electrical measuring instrument, the combination as claimed in claim 10, in combination with guide means preventing axial movement of said core during said rectilinear displacement thereof.

12. A ratio meter of the double coil type, said meter comprising two coils of rectangular shape in the same plane with adjacent side edges in contact, pivot bases at the ends of the coils and carrying pivots defining a rotational axis extending along the contacting faces of said coils, cement securing said coils to each other and to said pivot bases, a permanent magnet system having spaced polar surfaces, means including said pivots supporting said coils for angular movement in the space between said polar surfaces, a longitudinally bored core of approximately C-section, and means supporting said core with the legs thereof extending through the respective coils.

13. In an electrical measuring instrument, a supporting base, a magnet secured to said base and having spaced polar faces, a core in the space between said polar faces, means carried by said magnet to support said core for adjustment between and at right angles to the axis of said polar faces, and means guiding said core during adjustment thereof, said guide means comprising studs carried by said base and slots in said core for receiving said studs.

KARL M. LEDERER.

CERTIFICATE OF CORRECTION.

Patent No. 2,221,643. November 12, 1940.

KARL M. LEDERER.

It is hereby certified that error appears in the printed specification of the above numbered patent requiring correction as follows: Page 2, second column, lines 60 and 61, claim 1, strike out the words "rectilinear displacement in the plane of symmetry between said polar faces and"; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.